(12) United States Patent
Silverbrook et al.

(10) Patent No.: US 7,934,655 B2
(45) Date of Patent: *May 3, 2011

(54) INPUT ARRANGEMENT FOR CONTROLLING ELECTRONIC DEVICE

(75) Inventors: Kia Silverbrook, Balmain (AU); Paul Lapstun, Balmain (AU); Jacqueline Anne Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 46 days.

This patent is subject to a terminal disclaimer.

(21) Appl. No.: 12/501,453

(22) Filed: Jul. 12, 2009

(65) Prior Publication Data

US 2009/0267915 A1 Oct. 29, 2009

Related U.S. Application Data

(63) Continuation of application No. 11/756,630, filed on Jun. 1, 2007, now Pat. No. 7,568,622, which is a continuation of application No. 11/159,196, filed on Jun. 23, 2005, now Pat. No. 7,322,524, which is a continuation of application No. 09/693,515, filed on Oct. 20, 2000, now Pat. No. 6,965,454.

(30) Foreign Application Priority Data

Oct. 25, 1999 (AU) .................................. PQ3632

(51) Int. Cl.
*G06K 7/10* (2006.01)
(52) U.S. Cl. ............... 235/454; 235/462.45; 235/472.01
(58) Field of Classification Search .................. 235/375, 235/380, 454, 462.45, 472.01; 358/473, 358/1.15, 1.9; 382/314, 188
See application file for complete search history.

(56) References Cited

U.S. PATENT DOCUMENTS

| | | |
|---|---|---|
| 4,839,634 A | 6/1989 | More et al. |
| 4,864,618 A | 9/1989 | Wright et al. |
| 5,051,736 A | 9/1991 | Bennett et al. |
| 5,226,091 A | 7/1993 | Howell et al. |
| 5,477,012 A | 12/1995 | Sekendur |

(Continued)

FOREIGN PATENT DOCUMENTS

EP 0407734 A 1/1991

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner* — Karl D. Frech

(57) ABSTRACT

An input arrangement for controlling an electronic device. The arrangement comprises a substrate have a position-coding pattern printed thereon. The position-coding pattern codes first and second sets of absolute positions on spatially separate areas of the substrate. The first and second sets of absolute positions are mutually exclusive and coded by first and second subsets of the position-coding pattern. A handheld image-recording device comprises an image sensor for recording images of the position-coding pattern a processor is configured for deriving an absolute position from the position-coding pattern in the recorded image and providing an instruction to the electronic device to perform a first function when the absolute position belongs to the first set and a second function when the absolute position belongs to the second set.

10 Claims, 19 Drawing Sheets

U.S. PATENT DOCUMENTS

| | | | |
|---|---|---|---|
| 5,640,193 A | 6/1997 | Wellner | |
| 5,652,412 A | 7/1997 | Lazzouni et al. | |
| 5,661,506 A | 8/1997 | Lazzouni et al. | |
| 5,692,073 A | 11/1997 | Cass | |
| 5,748,931 A | 5/1998 | Jones et al. | |
| 5,852,434 A | 12/1998 | Sekendur | |
| 5,897,648 A | 4/1999 | Henderson | |
| 5,970,231 A | 10/1999 | Crandall | |
| 5,995,976 A | 11/1999 | Walker et al. | |
| 6,076,734 A | 6/2000 | Dougherty et al. | |
| 6,081,261 A | 6/2000 | Wolff et al. | |
| 6,330,976 B1 | 12/2001 | Dymetman et al. | |
| 6,502,756 B1 | 1/2003 | Fanghraeus | |
| 6,537,324 B1 | 3/2003 | Tabata et al. | |
| 6,628,847 B1 | 9/2003 | Kasabach et al. | |
| 6,729,547 B1 | 5/2004 | Charlier et al. | |
| 6,957,768 B1 | 10/2005 | Silverbrook et al. | |
| 6,962,450 B2 | 11/2005 | Brouhon et al. | |
| 6,964,374 B1 | 11/2005 | Djuknic et al. | |
| 6,965,454 B1 | 11/2005 | Silverbrook et al. | |
| 7,123,239 B1 | 10/2006 | Lapstun et al. | |
| 7,134,606 B2 | 11/2006 | Chou | |
| 7,233,320 B1 | 6/2007 | Lapstun et al. | |
| 7,249,716 B2 | 7/2007 | Bryborn | |
| 7,503,493 B2 | 3/2009 | Silverbrook et al. | |
| 7,568,622 B2 * | 8/2009 | Silverbrook et al. | 235/454 |
| 7,832,640 B2 | 11/2010 | Silverbrook et al. | |
| 2002/0011989 A1 | 1/2002 | Ericson et al. | |
| 2004/0061888 A1 | 4/2004 | Braun et al. | |
| 2004/0135776 A1 | 7/2004 | Brouhon | |
| 2004/0160430 A1 | 8/2004 | Tokunaga et al. | |
| 2004/0189672 A1 | 9/2004 | Yamazaki et al. | |
| 2005/0052706 A1 | 3/2005 | Nelson | |
| 2006/0087497 A1 | 4/2006 | Borgaonkar et al. | |

FOREIGN PATENT DOCUMENTS

| | | |
|---|---|---|
| GB | 2306669 A | 5/1997 |
| WO | WO 99/18487 A2 | 4/1999 |
| WO | WO 99/19823 A | 4/1999 |
| WO | WO 99/50787 A1 | 10/1999 |

* cited by examiner

DRAWING PALETTE　　　　PAGE 1 OF 2

PEN SHAPE　　PEN SIZE　　PEN TEXTURE

PEN COLOR　　FILL COLOR　　FILL PATTERN

FONT　　FONT SIZE　　FONT STYLE

- FONT 1
- FONT 2
- FONT 3

8, 9, 10, 12, 14, 18, 24, 36, 48

- BOLD
- ITALIC
- UNDERLINE

537

GRID SIZE 0.25 IN, 0.5 IN, 1 IN, 1.5 IN, 2 IN, 3 IN

REPRINT

FIG. 21

INPUT ARRANGEMENT FOR CONTROLLING ELECTRONIC DEVICE

CROSS REFERENCE TO RELATED APPLICATIONS

This is a continuation of U.S. application Ser. No. 11/756,630 dated Jun. 1, 2007, now issued U.S. Pat. No. 7,568,622 which is a continuation of U.S. application Ser. No. 11/159,196 filed on Jun. 23, 2005, now issued U.S. Pat. No. 7,322,524, which is continuation of U.S. application Ser. No. 09/693,515 filed on Oct. 20, 2000, now issued U.S. Pat. No. 6,965,454, the entire contents of which are herein incorporated by reference.

FIELD OF INVENTION

The present invention relates generally to computing systems and, more particularly, to a method and system for enabling graphic design by means of a computer system. It has specific application to the operation of a computer system involving a printed form-based user interface.

CO-PENDING APPLICATIONS

Various methods, systems and apparatus relating to the present invention are disclosed in the following co-pending applications/granted patents filed by the applicant or assignee of the present invention on Oct. 20, 2000:

| | | | | | |
|---|---|---|---|---|---|
| 7,190,474 | 7,110,126 | 6,813,558 | 6,965,454 | 6,847,883 | 7,131,058 |
| 7,533,031 | 6,982,798 | 6,474,888 | 6,627,870 | 6,724,374 | 7,369,265 |
| 6,454,482 | 6,808,330 | 6,527,365 | 6,474,773 | 6,550,997 | |

The disclosures of these co-pending applications are incorporated herein by cross-reference.

Various methods, systems and apparatus relating to the present invention are disclosed in the following co-pending applications/granted patents filed by the applicant or assignee of the present invention on Sep. 15, 2000:

| | | | |
|---|---|---|---|
| 6,679,420 | 6,963,845 | 6,995,859 | 6,720,985 |

The disclosures of these co-pending applications are incorporated herein by cross-reference.

Various methods, systems and apparatus relating to the present invention are disclosed in the following co-pending applications/granted patents filed by the applicant or assignee of the present invention on Jun. 30, 2000:

| | | | | | |
|---|---|---|---|---|---|
| 6,824,044 | 6,678,499 | 6,976,220 | 6,976,035 | 6,766,942 | 7,286,113 |
| 6,922,779 | 6,978,019 | 7,406,445 | 6,959,298 | 6,973,450 | 7,150,404 |
| 6,965,882 | 7,233,924 | 7,007,851 | 6,957,921 | 6,457,883 | 6,831,682 |
| 6,977,751 | 6,398,332 | 6,394,573 | 6,622,923 | | |

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:

| | | | | |
|---|---|---|---|---|
| 6,428,133 | 6,526,658 | 6,315,399 | 6,338,548 | 6,540,319 |
| 6,328,431 | 6,328,425 | 6,991,320 | 6,383,833 | 6,464,332 |
| 6,390,591 | 7,018,016 | 6,328,417 | 09/575,197 | 7,079,712 |
| 6,825,945 | 7,330,974 | 6,813,039 | 6,987,506 | 7,038,797 |
| 6,980,318 | 6,816,274 | 7,102,772 | 7,350,236 | 6,681,045 |
| 6,728,000 | 7,173,722 | 7,088,459 | 09/575,181 | 7,068,382 |
| 7,062,651 | 6,789,194 | 6,789,191 | 6,644,642 | 6,502,614 |
| 6,622,999 | 6,669,385 | 6,549,935 | 6,987,573 | 6,727,996 |
| 6,591,884 | 6,439,706 | 6,760,119 | 7,295,332 | 6,290,349 |
| 6,428,155 | 6,785,016 | 6,870,966 | 6,822,639 | 6,737,591 |
| 7,055,739 | 7,233,320 | 6,830,196 | 6,832,717 | 6,957,768 |
| 7,456,820 | 7,170,499 | 7,106,888 | 7,123,239 | 6,409,323 |
| 6,281,912 | 6,604,810 | 6,318,920 | 6,488,422 | 6,795,215 |
| 7,154,638 | 6,859,289 | | | |

The disclosures of these co-pending applications are incorporated herein by cross-reference.

BACKGROUND

Virtually since the advent of graphical user interfaces for computer systems have applications been available which enable the user to create and edit graphic images, and such applications have achieved an extremely high level of sophistication. In the context of drawing and painting applications, computer monitors are able to display two-dimensional graphic representations of image elements which are inputted or controlled by the user via a pointer or cursor function. Conventionally, the pointer or cursor function is operated by means of a mouse, and the user is able to select from a number of available menus attributes of freehand drawing and painting strokes produced by movement of the mouse, such as pen or brush thickness and ink/paint color. In addition, the user can select and insert objects such as prescribed shapes and drawing/painting elements, text, images, paint fill, etc. Once an image has been produced, the user is able to edit it as desired using a suite of available editing functions, and the final image can then be printed by way of appropriate available printing means. Users of such applications range from, at one end of the scale, a graphic designer using a professional graphic design suite, allowing rendering and manipulation of two-dimensional images of complex 3D objects, to an operator conversing with a client or colleague, who simply wishes to communicate an idea of interest in graphic form. In the latter situation, the operator can sketch an idea using the computer application, and then send the sketch via, for example, electronic mail.

Further advances on the above concept have evolved with the development of computer peripheral devices such as touch screen displays and display overlays, and so-called electronic sketchpads. The latter devices employ sensing digitizer tablets, based on any of a number of alternative sensing technologies such as resistive, capacitive and acoustic techniques. The operator uses an appropriate stylus on the tablet to input freehand strokes, and presses 'buttons' on the tablet to select from various objects, attributes and commands, which actions result in strokes and objects appearing in real time in an image on the operator's computer display. This type of system has the evident advantage that it is able to far more closely simulate the graphic designer's desktop environment and drawing tools.

SUMMARY OF INVENTION

It is an objective of the present invention to provide a method and system for enabling graphic design by means of a computer system.

According to the present invention in a first aspect, there is provided a method of enabling graphic design by means of a computer system, the method including the steps of:

printing on demand, on a surface, a form containing information relating to a graphic design activity, and at the same time as printing said information, printing on the surface coded data indicative of an identity of the form and of at least one reference point of the form;

receiving, in a computer system, indicating data from a sensing device regarding the identity of the form and a position of the sensing device relative to the form, the sensing device, when placed in an operative position relative to the form, sensing the indicating data using at least some of the coded data; and identifying, in the computer system and from the indicating data, at least one parameter relating to the graphic design activity.

According to the present invention in a second aspect, there is provided a method of enabling graphic design by means of a computer system, the method including the steps of:

printing on demand, on a surface, a form containing information relating to a graphic design activity, and at the same time as printing the information, printing on the surface coded data indicative of at least one parameter of the graphic design activity;

receiving, in a computer system, data from a sensing device regarding said at least one parameter and regarding movement of the sensing device relative to the form, the sensing device, when moved relative to the form, sensing the data regarding said at least one parameter using at least some of the coded data and generating the data regarding its own movement relative to the form; and interpreting, in the computer system, said movement of the sensing device as it relates to said at least one parameter.

According to the present invention in a third aspect, there is provided a system for enabling graphic design by means of a computer system, including:

a form printed on a surface, the form containing information relating to a graphic design activity, the form including coded data indicative of an identity of the form and of at least one reference point of the form;

a printer operative to print on demand the form by printing on the surface the information and at the same time the coded data; and a computer system for receiving indicating data from a sensing device for identifying at least one parameter relating to the graphic design activity, the indicating data being indicative of the identity of the form and a position of the sensing device relative to the form, the sensing device sensing the indicating data using at least some of the coded data.

According to the present invention in a fourth aspect, there is provided a system for enabling graphic design by means of a computer system, including:

a form printed on a surface, the form containing information relating to a graphic design activity, the form including coded data indicative of at least one parameter of the graphic design activity;

a printer operative to print on demand the form by printing on the surface the information and at the same time the coded data; and a computer system for receiving data from a sensing device regarding said at least one parameter and regarding movement of the sensing device relative to the form, and for interpreting said movement of the sensing device as it relates to said at least one parameter, the sensing device, when moved relative to the form, sensing the data regarding said at least one parameter using at least some of the coded data and generating the data regarding its own movement relative to the form.

Accordingly, the present invention provides a method and system which utilizes one or more forms capable of interacting with a computer system. Whilst the novel method and system of the present invention may be used in conjunction with a single computer system, in a particularly preferred form it is designed to operate over a computer network, such as the Internet.

Physically, the form is disposed on a surface medium which may be of any suitable structure. However, in a preferred embodiment, the form is disposed on sheet material such as paper or the like which has the coded data printed on it and which allows interaction with the computer system. The coded data is detectable preferably, but not exclusively, outside the visible spectrum, thereby enabling it to be machine-readable but substantially invisible to the human eye. The form may also include visible material which provides information to a user, such as the application or purpose of the form, and which visible information may be registered or correlate in position with the relevant hidden coded data.

The system also includes a sensing device to convey data from the form to the computer system, and in some instances, to contribute additional data. Again, the sensing device may take a variety of forms but is preferably compact and easily portable. In a particularly preferred arrangement, the sensing device is configured as a pen which is designed to be able to physically mark the interactive form as well as to selectively enable the coded data from the form to be read and transmitted to the computer system. The coded data then provides control information, configured such that designation thereof by a user causes instructions to be applied to the software running on the computer system or network.

The nature of the interaction between the form and the sensing device and the data that each contributes to the computer system may vary. In one arrangement, the coded data on the form is indicative of the identity of the form and of at least one reference point on that form. In another embodiment, the interactive form includes coded data which is indicative of a parameter of the form, whereas the sensing device is operative to provide data regarding its own movement relative to that form to the computer system together with coded data from the form. In yet another arrangement, the form includes the coded data which at least identifies the form, and the sensing device is designed to provide, to the computer system, data based on the form coded data, and also on data which identifies the user of the device.

In a preferred arrangement, the system and method also employs specially designed printers to print the interactive form. Further these printers constitute or form part of the computer system and are designed to receive data from the sensing device. As indicated above, the system and method of the invention is ideally suited to operate over a network. In this arrangement, the printers are fully integrated into the network and allow for printing of the interactive forms on demand and also for distributing of the forms using a mixture of multicast and pointcast communication protocols.

Accordingly, in a preferred form, the present invention provides methods and systems which use a paper and pen based interface for a computer system. This provides many significant benefits over traditional computer systems. The advantage of paper is that it is widely used to display and record information. Further, printed information is easier to read than information displayed on a computer screen. Moreover, paper does not run on batteries, can be read in bright light, or robustly accepts coffee spills or the like and is portable and disposable. Furthermore, the system allows for hand-drawing and hand-writing to be captured which affords greater richness of expression than input via a computer keyboard and mouse.

BRIEF DESCRIPTION OF DRAWINGS

Preferred and other embodiments of the invention will now be described, by way of non-limiting example only, with reference to the accompanying drawings, in which:

FIG. 21 shows a Modal Palette; and

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our earlier applications, including in particular applications U.S. Ser. No. 09/575,129, U.S. Ser. No. 09/575,174, U.S. Ser. No. 09/575,155, U.S. Ser. No. 09/575, 195 and U.S. Ser. No. 09/575,141. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
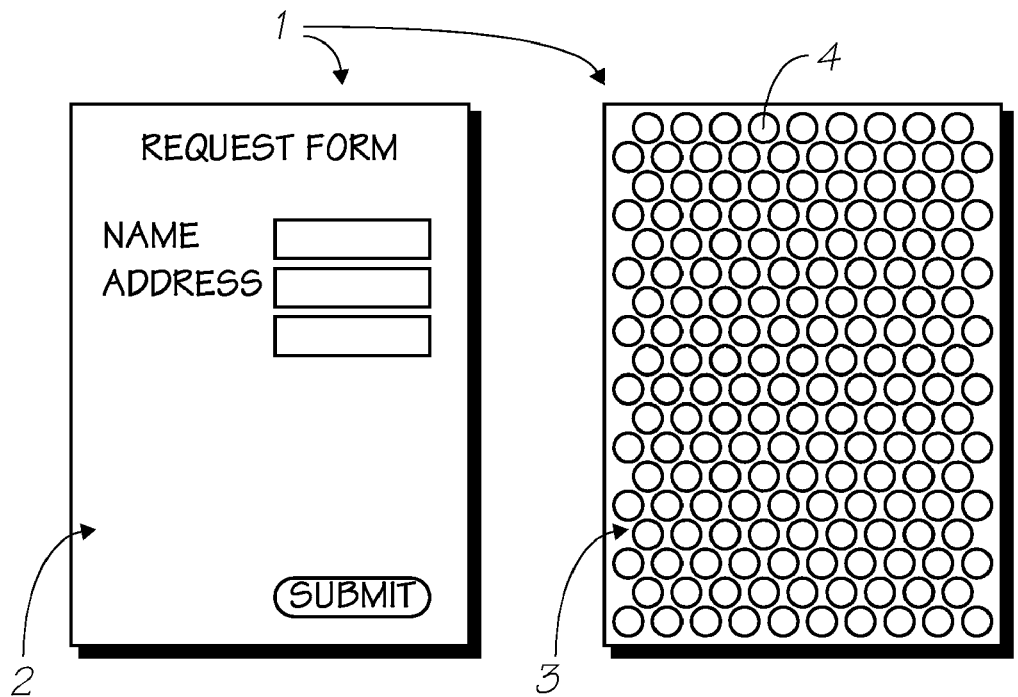
FIG. 1 is a schematic of a the relationship between a sample printed netpage and its online page description.
Figure 1:
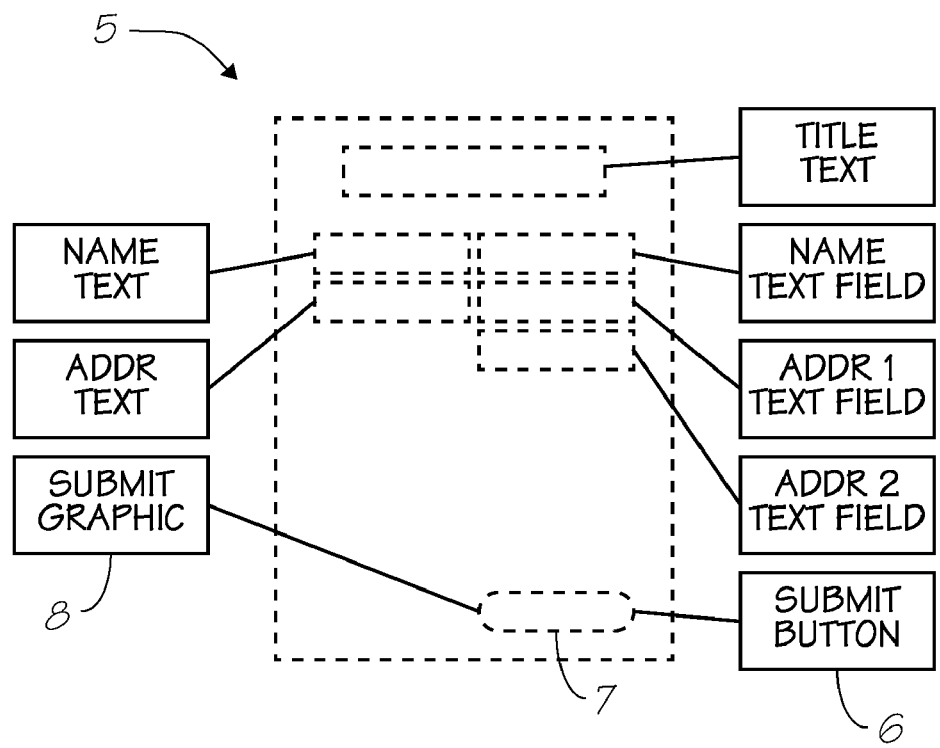

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
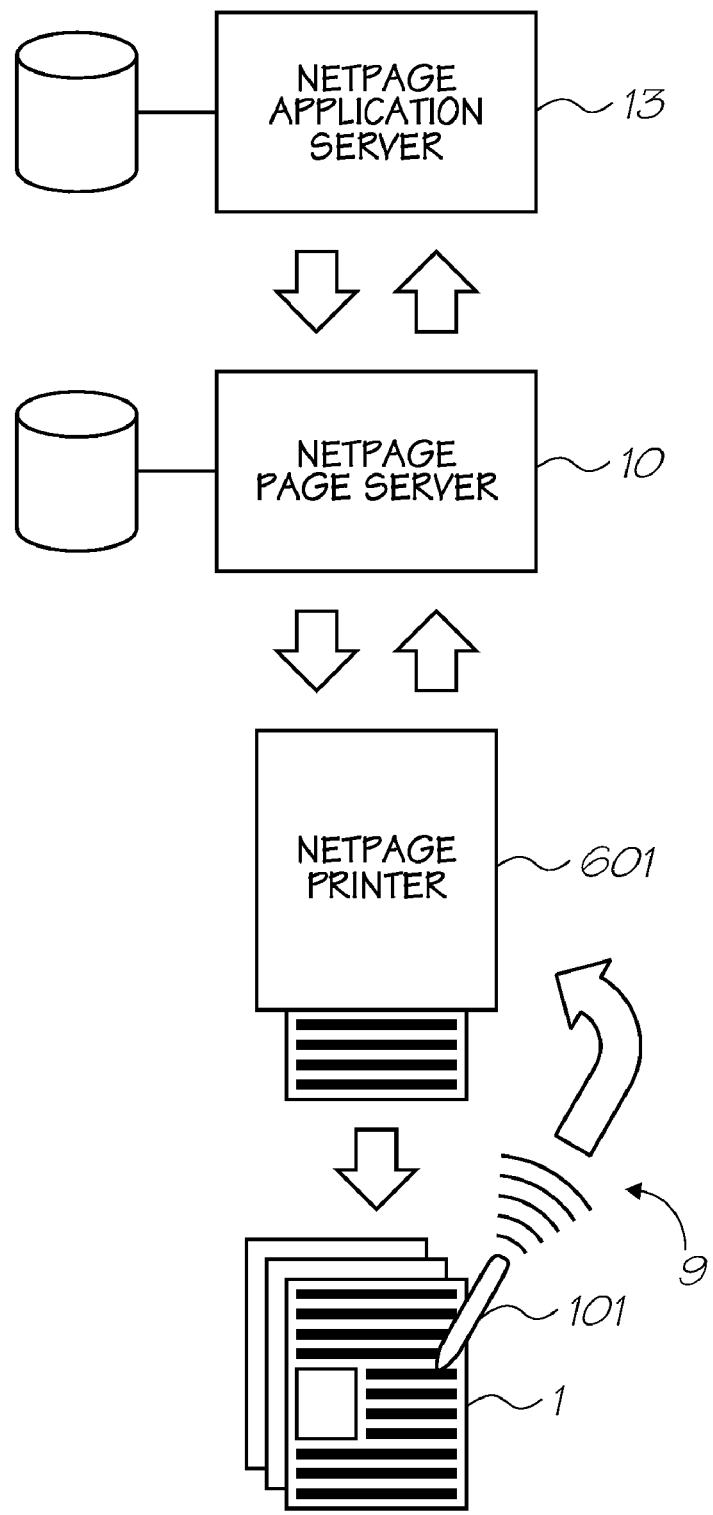
FIG. 2 is a schematic view of a interaction between a netpage pen, a netpage printer, a netpage page server, and a netpage application server.

As illustrated in FIG. 2, the netpage pen 101, a preferred form of which is described in our earlier application U.S. Ser. No. 09/575,174, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our earlier application U.S. Ser. No. 09/575,155 and our co-filed application U.S. Ser. No. 09/693,514, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our earlier application U.S. Ser. No. 09/575,141. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 45 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link.

Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
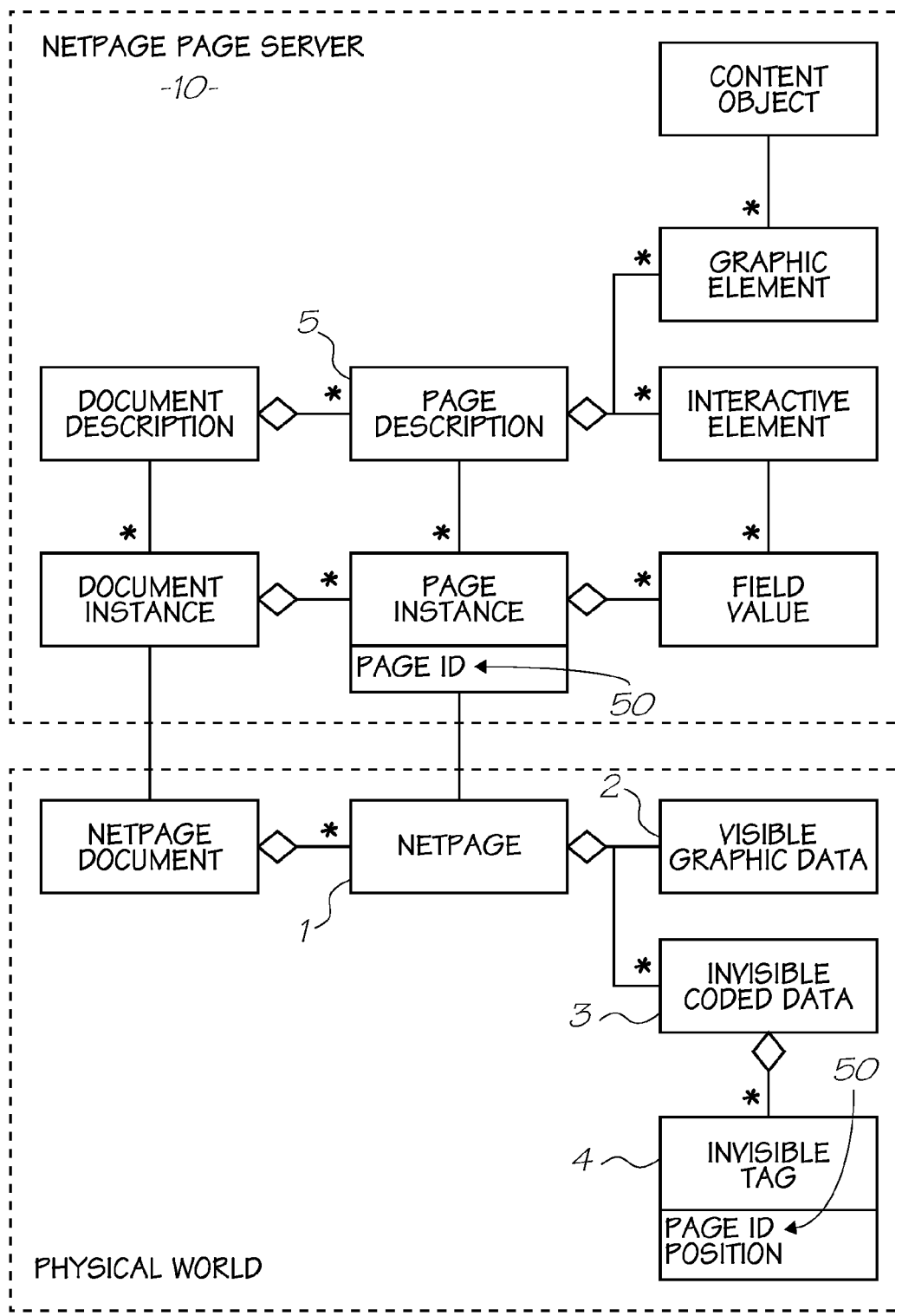
FIG. 3 is a schematic view of a high-level structure of a printed netpage and its online page description.

The relationship between the page description, the page instance, and the printed netpage is shown in FIG. 3. The printed netpage may be part of a printed netpage document 14. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ (~$10^{27}$ or a thousand trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
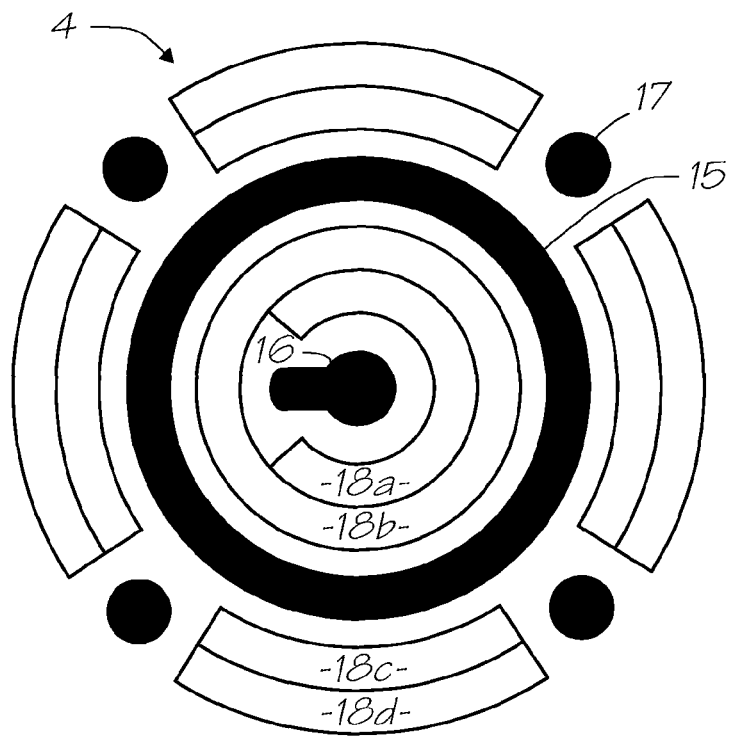
FIG. 4A is a plan view showing a structure of a netpage tag.

One embodiment of the physical representation of the tag, shown in FIG. 4A and described in our earlier application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
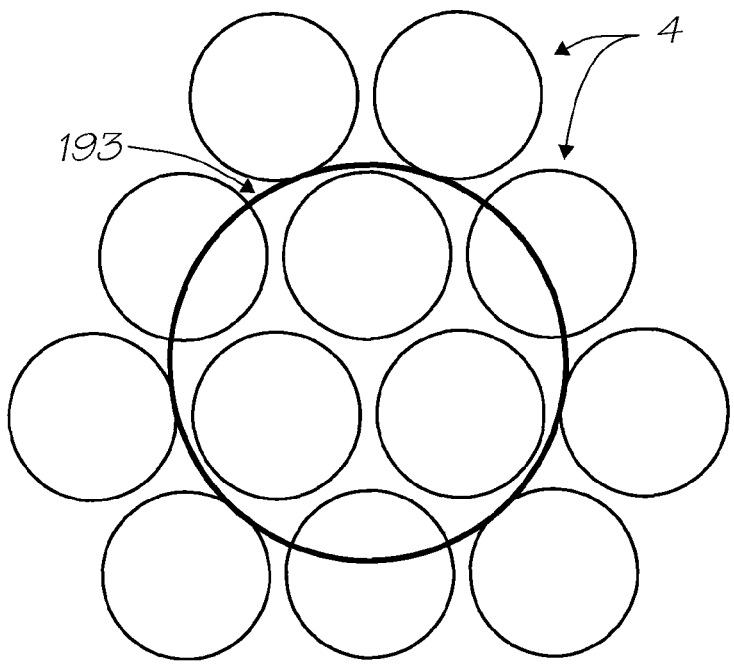
FIG. 4B is a plan view showing a relationship between a set of the tags shown in FIG. 4A and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4B.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
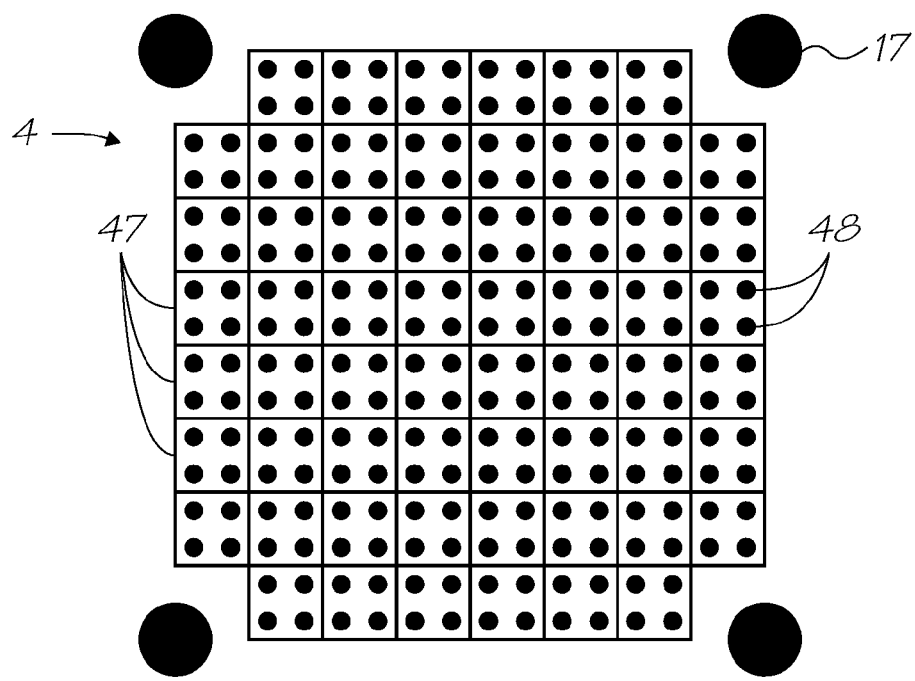
FIG. 5A is a plan view showing an alternative structure of a netpage tag.
Figure 5B:
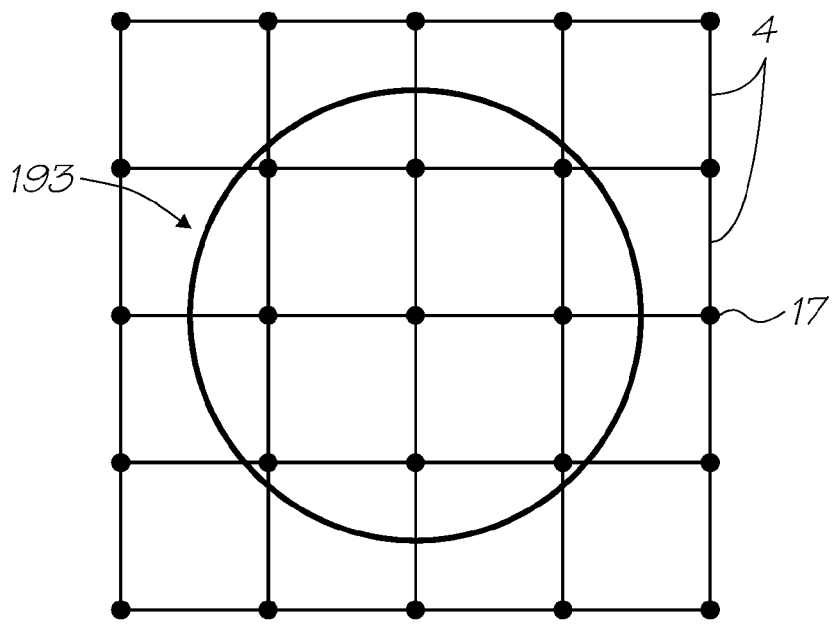
FIG. 5B is a plan view showing a relationship between a set of the tags shown in FIG. 5A and a field of view of a netpage sensing device in the form of a netpage pen.
Figures 5C, 5D:
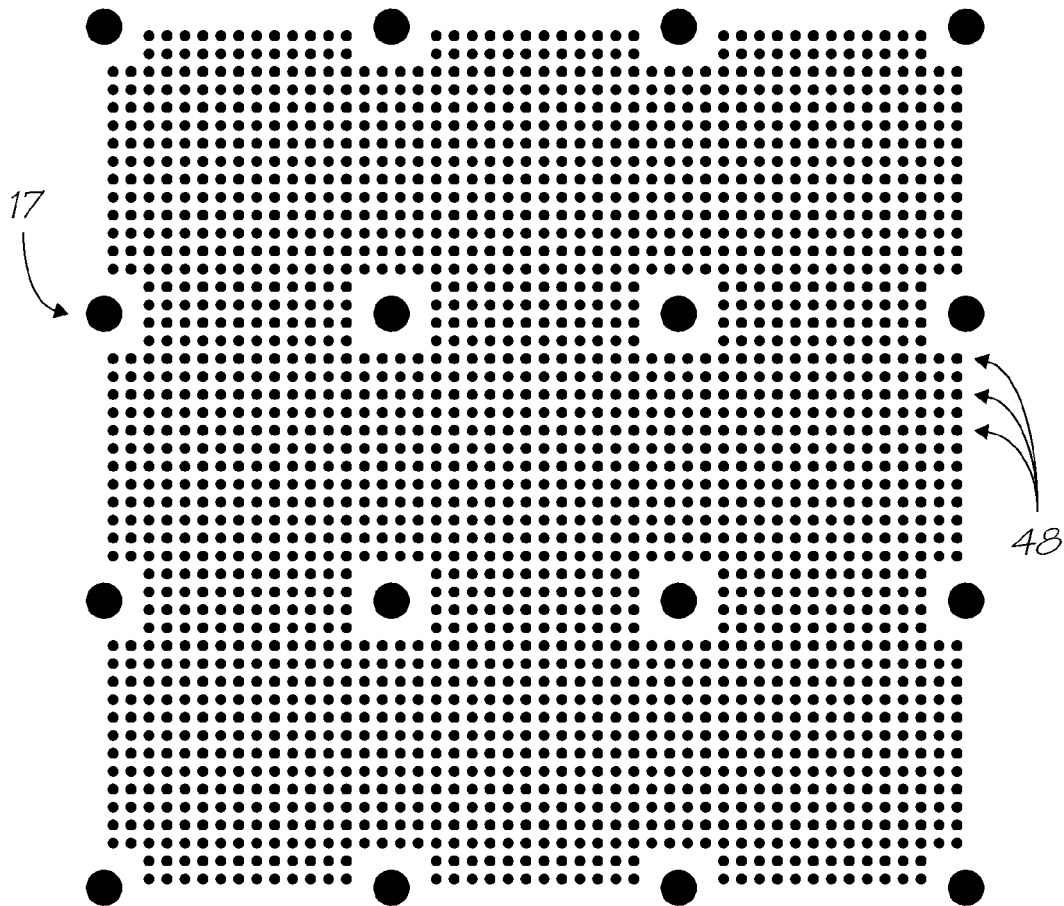
FIG. 5C is a plan view showing an arrangement of nine of the tags shown in FIG. 5A where targets are shared between adjacent tags.
FIG. 5D is a plan view showing the interleaving and rotation of the symbols of the four codewords of the tag shown in FIG. 5A.

An alternative tag structure more suited to a regular tiling is shown in FIG. 5A. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5B and 5C. FIG. 5B shows a square tiling of 16 tags and the corresponding minimum field of view 193, which must span the diagonals of two tags. FIG. 5C shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5D, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded Cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our earlier application U.S. Ser. No. 09/575, 174.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

Figures 6, 7:
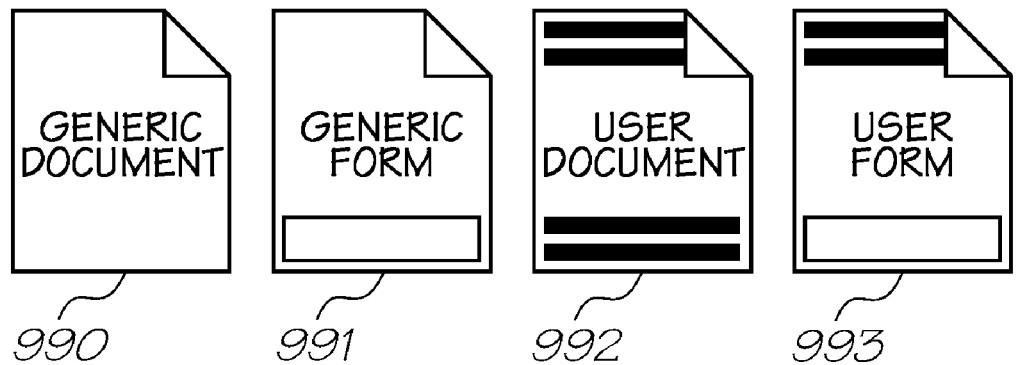
FIG. 6 is a schematic view of a set of user interface flow document icons.
FIG. 7 is a schematic view of a set of user interface page layout element icons.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 6 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 7, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

Drawing and Painting Using the Netpage System

The marking nib of a netpage pen is typically a ballpoint which produces a fixed-width line of a single fixed color. Nevertheless, the netpage system can be used to draw and paint interactively using a variety of line styles, colors, and brushes. Not unlike a drawing or painting application in a conventional graphical user interface, the netpage application presents a palette of available styles which can be used to draw or paint in what is sometimes referred to as "2½ dimensions", i.e. in two dimensions with depth ordering of objects. The colors and styles used typically only become visible when the drawing or canvas page is reprinted, which generally takes place on demand.

Drawing & Painting Object Model

The Drawing and Painting object model revolves around a drawing provider, a drawing user, and a drawing.

Figure 8:
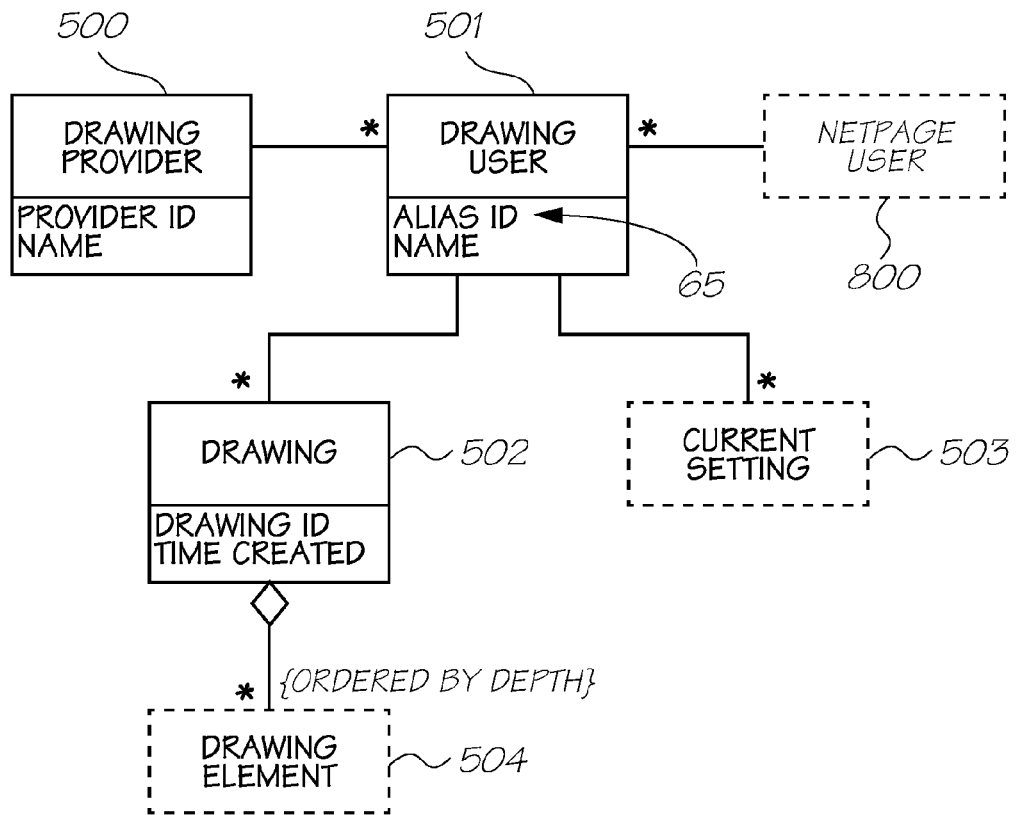
FIG. 8 is a class diagram representing a system according to the invention.

A drawing provider 500 has a provider identifier and a name. A drawing provider 500 is typically associated with a number of drawing users 501, each of which has a unique alias identifier 65 and a name. A netpage user 800 may of course be registered as a drawing user 501 with more than one drawing provider 500. The drawing and painting application class diagram is shown in FIG. 8.

Figure 9:
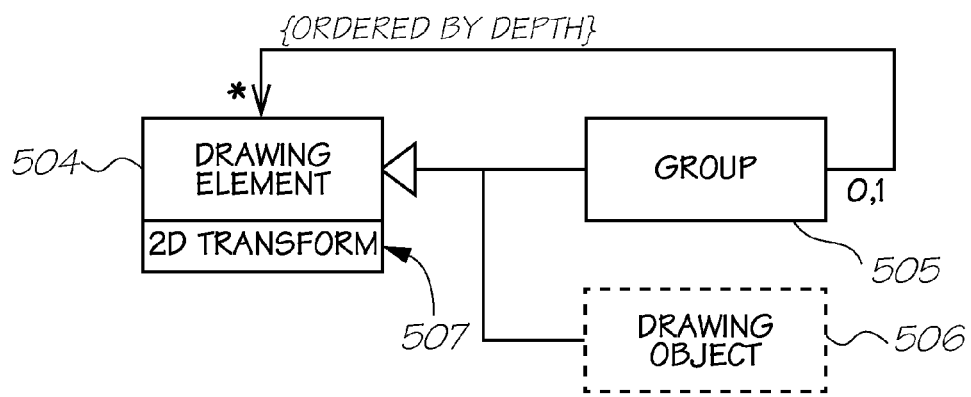
FIG. 9 is a drawing element class diagram.
Figure 10:
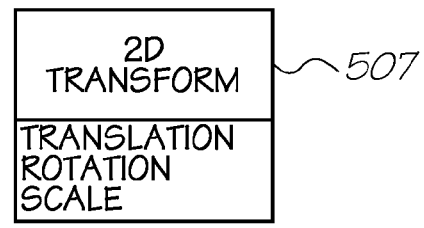
FIG. 10 is two-dimensional transform class diagram.

A drawing user 501 typically has a number of drawings 502, each of which has a unique drawing identifier, as well as the date and time the drawing was created. Associated with a drawing are a number of drawing elements 504, ordered by depth, and each drawing element 504 has a two-dimensional (2D) transform 507, which comprises a translation, a rotation, and a scale. The 2D Transform class diagram is shown in FIG. 10. A drawing element 504 may be a group 505, containing one or more drawing elements ordered by depth, or it may be a drawing object 506, and the Drawing Element class diagram of the netpage system is shown in FIG. 9.

Figure 11:
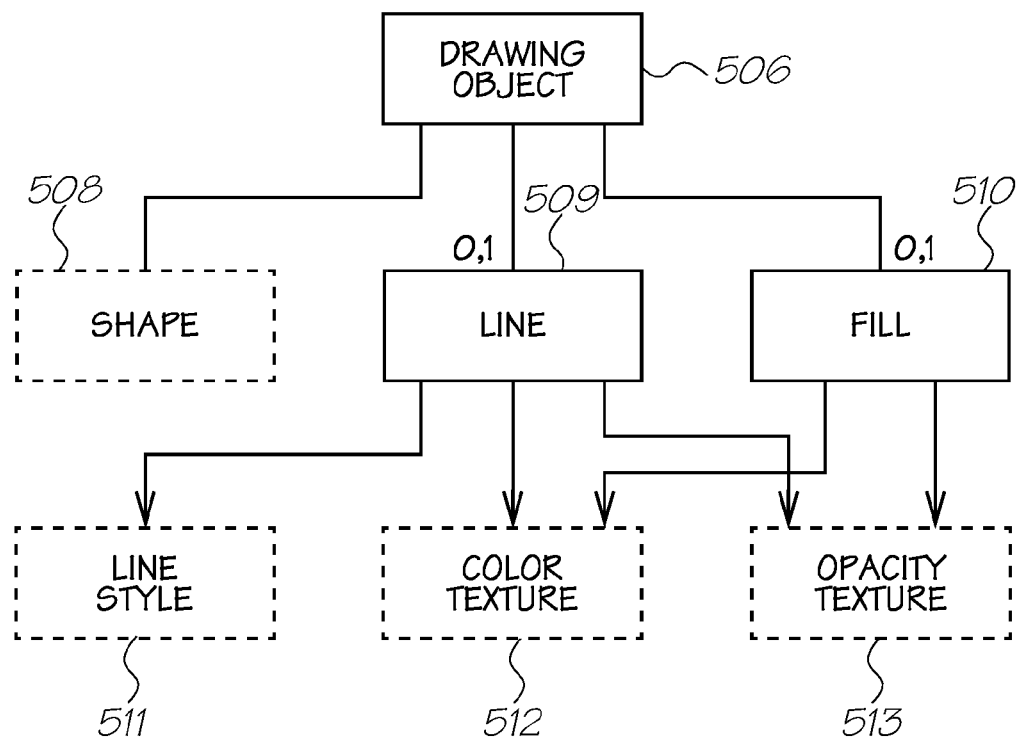
FIG. 11 is a drawing object class diagram.
Figure 12:
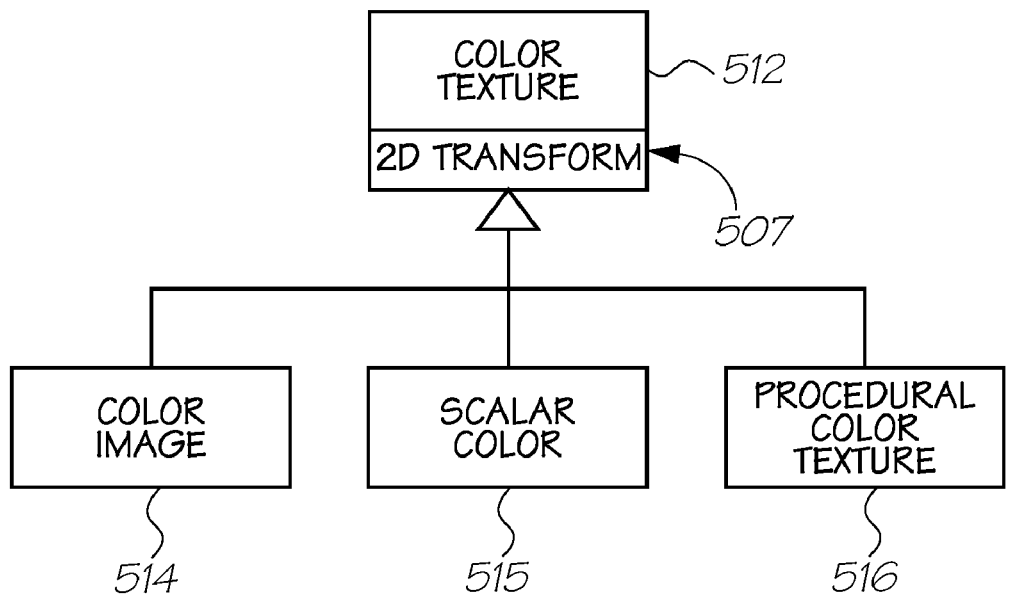
FIG. 12 is a color texture class diagram.
Figure 13:
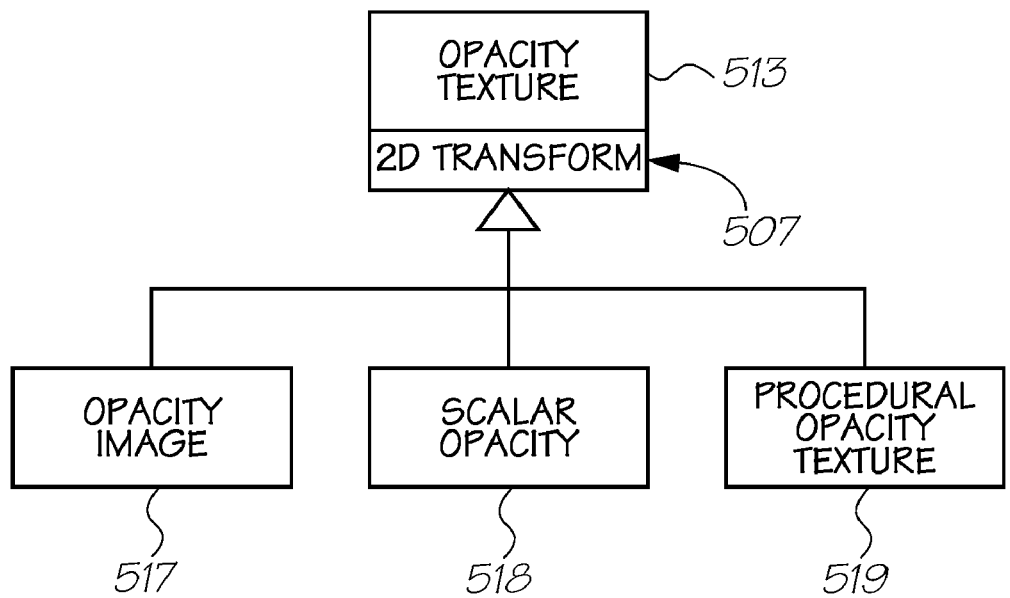
FIG. 13 is an opacity texture class diagram.

A drawing object 506 has associated with it a shape 508, line information 509 (optional) and fill information 510 (optional). Line information 509 includes a line style 511, color texture 512, and opacity texture 513, whilst fill information 510 includes a color texture 512 and an opacity texture 513. A color texture 512 contains a 2D transform 507, and is either a color image 514, a scalar color 515, or a procedural color texture 516. An opacity texture 513 also contains a 2D transform 507, and is either an opacity image 517, a scalar opacity 518, or a procedural opacity texture 519. The netpage drawing object class diagram is shown in FIG. 11, the netpage color texture class diagram is shown in FIG. 12, and the netpage opacity texture class diagram is shown in FIG. 13.

Figure 14:
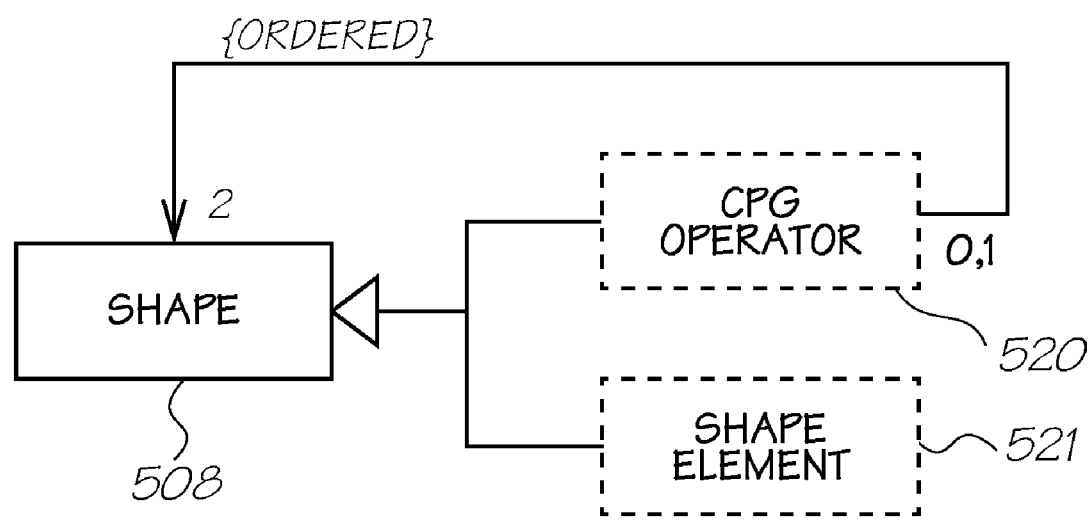
FIG. 14 is a shape class diagram.
Figure 16:
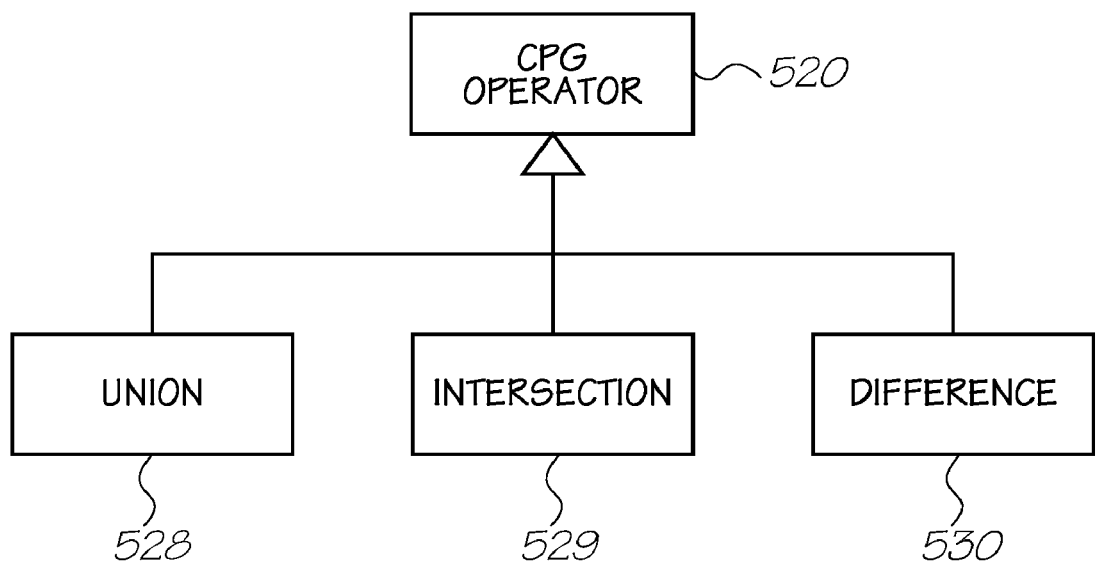
FIG. 16 is a constructive planar geometry (CPG) operator class diagram.

The shape class diagram is illustrated in FIG. 14. A shape 508 may be a shape element 521, or it may be a Constructive Planar Geometry (CPG) Operator 520 with two ordered shape elements 508. The CPG Operator 520 describes an operation to be performed on the two shape elements 508, the basic CPG operators being union 528, intersection 529, and difference 530. The shape order is important for the difference operator 530. These operators are described in detail in the section entitled "Constructive Solid Geometry" in "3D Computer Graphics", Alan Watt, Addison Wesley, 1993, the content of which is incorporated herein by reference. The CPG operator class diagram is shown in FIG. 16.

Figure 15:
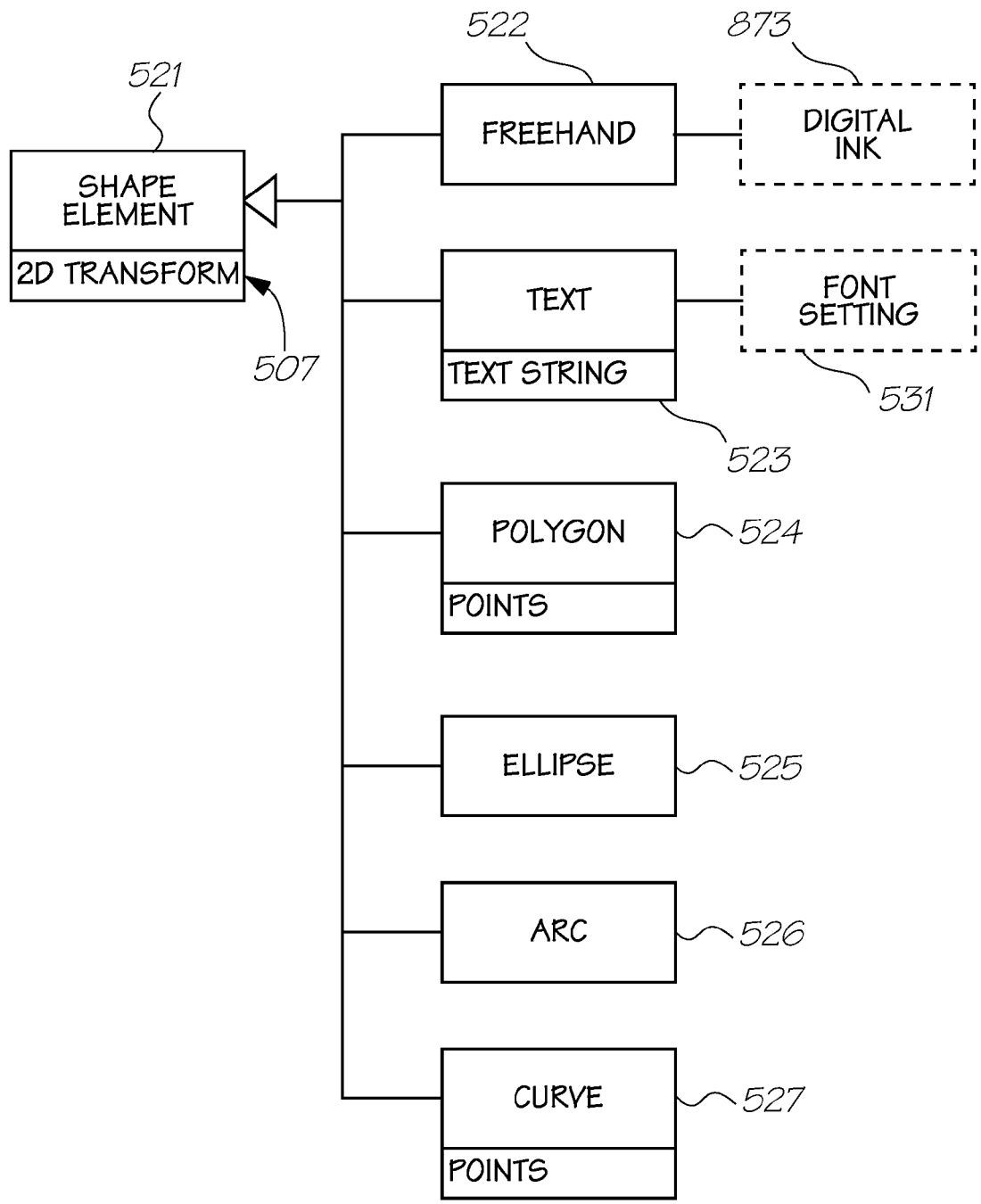
FIG. 15 is a shape element class diagram.

A shape element 521 contains a 2D transform 507, and can be a freehand object 522 (with associated digital ink 873), text 523 (with the text string and associated font settings 531), a polygon 524 (described by a list of points), an ellipse 525, an (elliptic) arc 526, or a curve 527. The Shape Element class diagram is shown in FIG. 15.

A polygon shape element 524 can specify an open polygon (polyline) or a closed polygon, and in the latter case the start and end points in the point list are identical. An ellipse shape element 525 is defined as a unit circle centred at the origin, and the associated 2D transform allows the definition of an arbitrary ellipse. An arc shape element 526 is similarly defined as a 90 degree arc of a unit circle in the first quadrant. A curve 527 is made up of a number of Bézier segments and is defined by a list of control points. It is to be noted that a drawing provider may also support other object types.

The above object model supports user-specified objects as well as third-party supplied objects (clip-art, graphics etc.).

The nib style 825 for a drawing object specifies the line (or pen) shape, size, color and texture, and is derived from the current nib style 825 associated with the netpage pen 801 being used. The netpage pen 801, nib style 825, and digital ink 873 are described in further detail in our earlier application U.S. Ser. No. 09/575,174.

Figure 17:
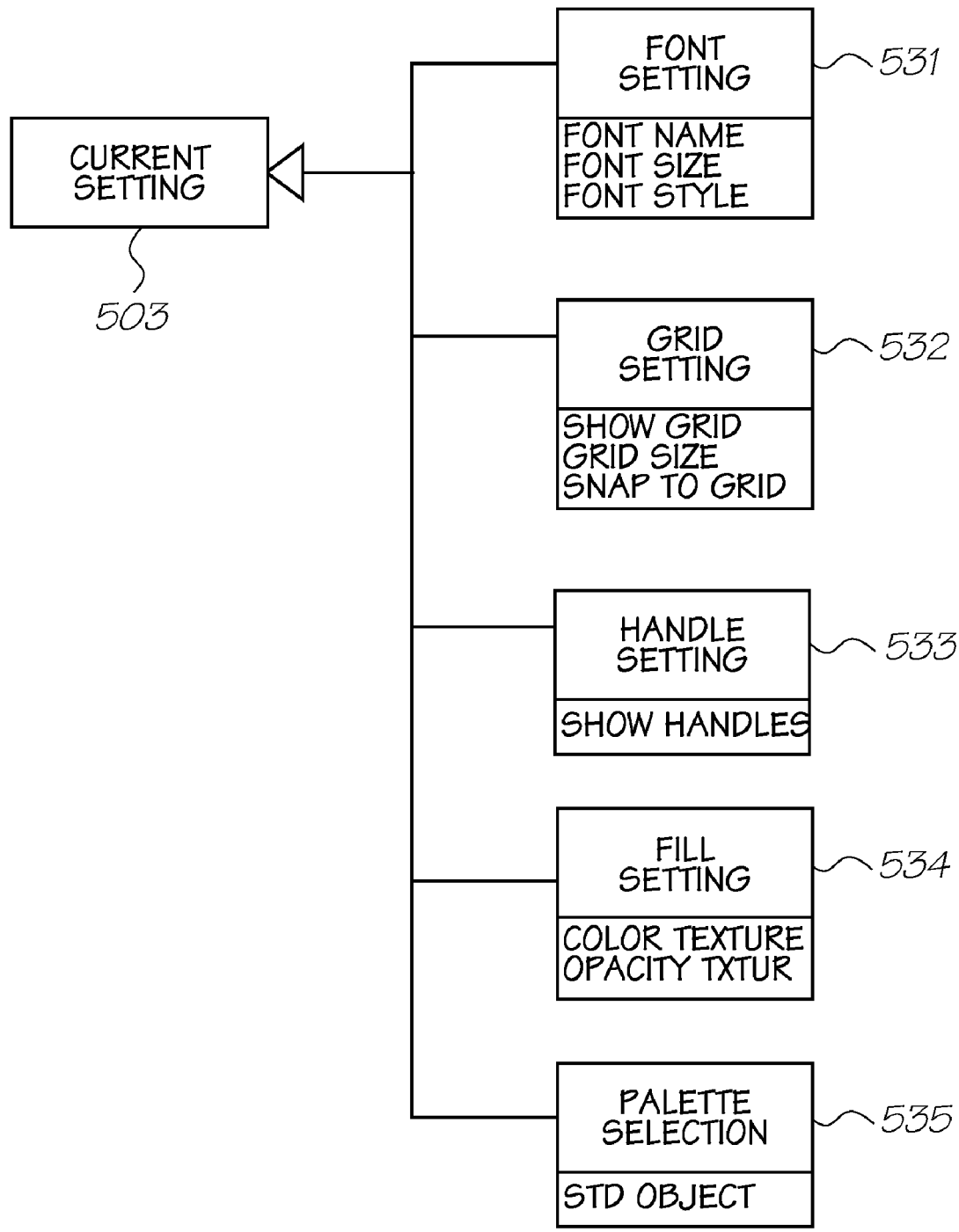
FIG. 17 is a current settings class diagram.

Associated with a drawing user 501 are the user's current settings 503 (font setting, grid setting, handle setting, fill setting, palette selection) for the drawing application. The font setting 531 records the font name, size and style of the font last selected by the user. The grid setting 532 records whether to show or hide grid lines, the grid size, and whether to snap objects to the grid. The handle setting 533 records whether to show or hide object handles. The fill setting 534 records the user's last selected fill color and opacity textures. The palette selection 535 records the standard object last selected from the object palette by the user. The current settings class diagram is shown in FIG. 17.

Drawing & Painting User Interface

The user may obtain the Drawing and Painting main page 536 from a variety of links, such as the netpage directory (i.e. via the help menu of the user's netpage printer) and the netpage user's own bookmark.

Drawing & Painting Main Page

Figure 19:
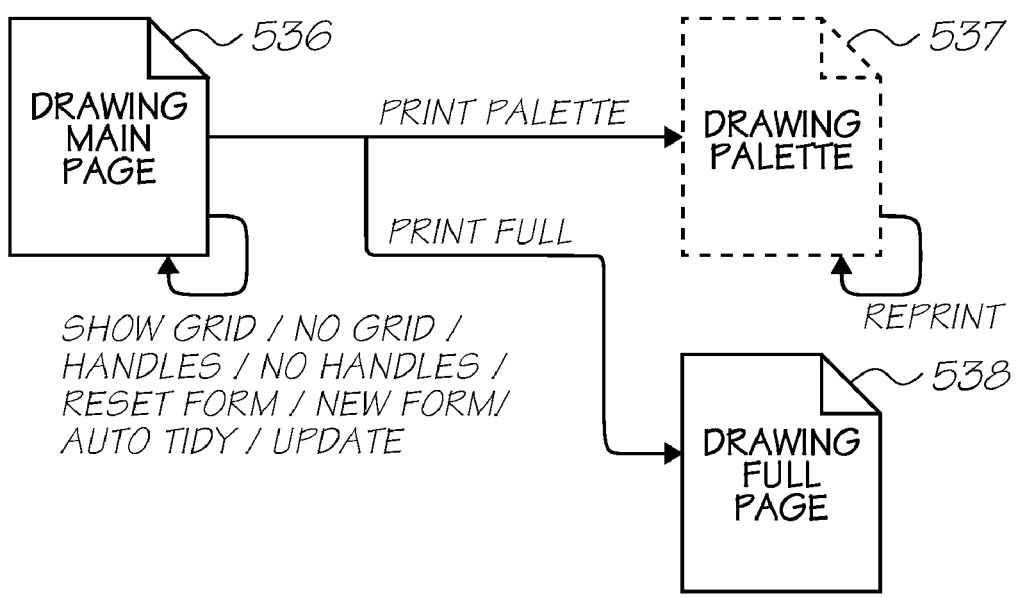
FIG. 19 illustrates a Drawing and Painting Main Page user interface flow.
Figure 20:
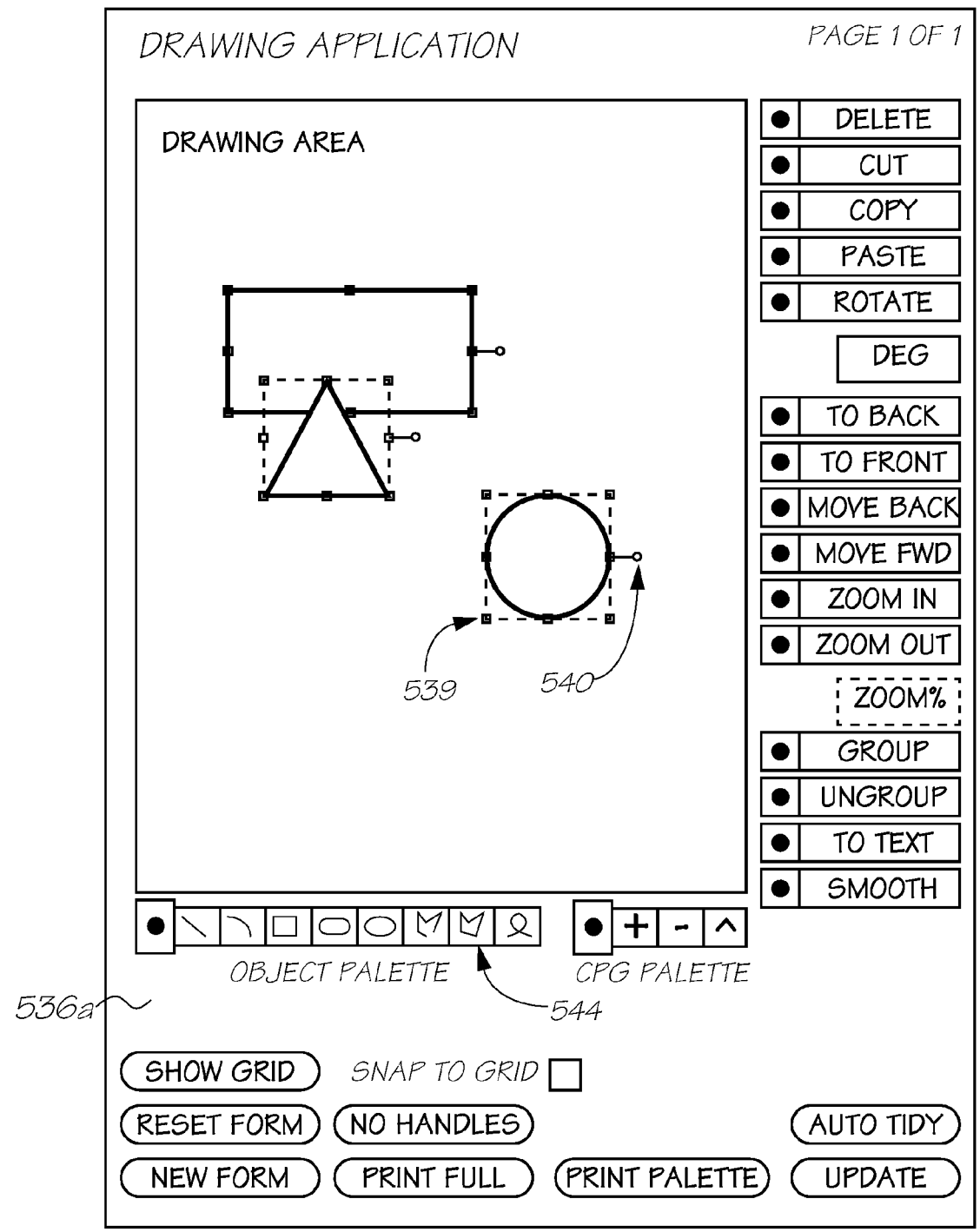
FIG. 20 shows a Modal Drawing page.

The Drawing Main Page 536 allows the user to draw and manipulate objects, and the Drawing Main Page user interface flow is illustrated in FIG. 19. The Drawing Main Page 536 comprises a drawing area, one or more palettes, command icons, and buttons, and an example of a drawing page is shown in FIG. 20.

The user can draw freehand objects, or can select standard objects from an object palette 544. The user can also write freehand text and, if desired, is able to convert it to text in a specified font. The user can select the desired colors, brush styles and fill styles for objects and text. Some operations can be modal, such as pen style selection, while others are not suited to modal operation (such as pasting an object) and so are modeless. When operating modally, the user selects brush, font, or other attributes from a palette by pressing the appropriate button on the page with the netpage pen. This mode is used in subsequent drawing actions, but may not be visible until the page is reprinted. When operating modelessly, the user applies attributes to a part of the drawing after it is drawn.

Modeless operations are implemented using "dragging", and the dragging action may be performed using the non-marking nib or the marking nib. Dragging can be used to apply an attribute to an object, to drop an object at a location, or to apply a command at a location. The starting point of the drag stroke is typically the command or palette icon, and the ending point of the drag stroke is typically a desired location. These interaction techniques are described in further detail in our earlier application U.S. Ser. No. 09/663,701.

Optionally the provider can expand the user interface to provide other functionality or other interaction techniques.

Modal Operations

When operating modally, the user simply selects colors and styles, by clicking the appropriate button on the palette, and draws or "paints" (by drawing) in the usual way on the surface of the page. There may be no indication of the current mode (color, pen, brush, etc.), the drawing or painting consisting merely of fixed-width and fixed-color drawn lines until the page is reprinted. If the pen has a built-in display, such as an LCD feature, then the display can indicate the current mode. Alternatively, the pen may have an embedded electronically controlled color indicator, in which case the indicator displays the user-selected color. This pen with color indicator is described in further detail in our co-filed application U.S. Ser. No. 09/693,216. There is no history of mode changes on the page itself. An example of a Modal Drawing Page 536a using a modal palette is shown in FIG. 20, and an example Modal Palette Page 537 is shown in FIG. 21.

Modeless Operations

When operating modelessly, color, pen and brush attributes are applied to a part of the picture after that part is drawn. Netpage provides one way to support modeless pen attributes, by enabling the joining of elements of the drawing to pen attributes in a palette using a lasso 541 drawn with the pen. The tail of the lasso is joined to the attribute in the palette, and the loop of the lasso circumscribes the part of the drawing to which the attribute is being applied. When a marking pen is used, the lasso feature provides a graphical representation of applying an attribute to a part of the drawing. Lassos can also be drawn with the pen in non-marking mode and a reprint can then be provided after each attribute is applied, either automatically on completion of lasso stroke, or on user request. Lassoing and related techniques are described in further detail in our earlier application U.S. Ser. No. 09/663,701.

Figure 22:
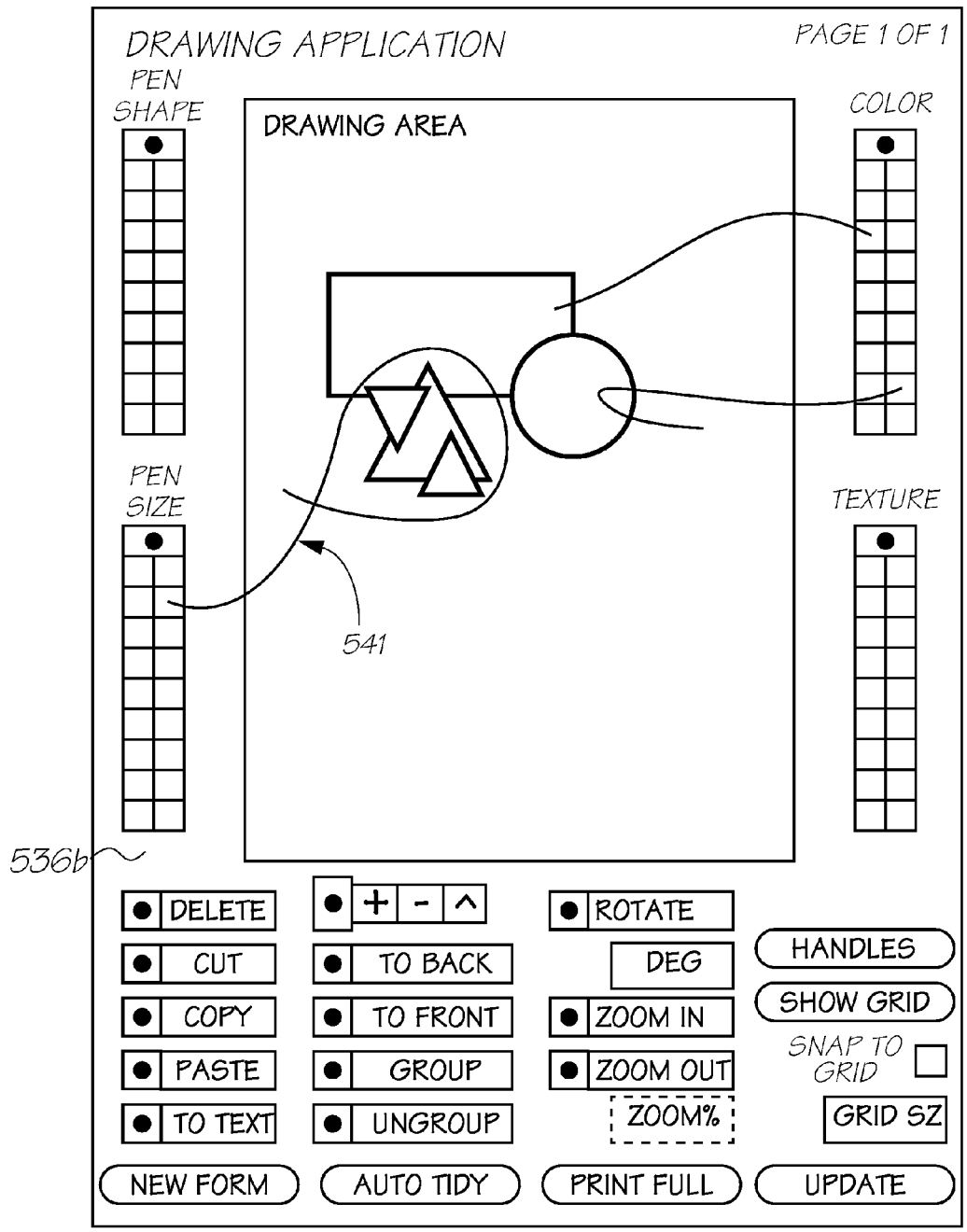
FIG. 22 shows a Modeless Drawing Page.

An example of a drawing page with a modeless palette (Modeless Drawing Page 536b) is shown in FIG. 22.

Object Handles

The user can choose to show handles on drawing objects by pressing the <Handles> button, in which case the drawing page is reprinted showing object handles, the <Handles> button being replaced by a <No Handles> button. Each object's bounding box is displayed as a faint dotted rectangle around the object, and each object has two types of handles—scaling handles 539 (small squares appearing along the bounding box) and a rotation handle 540 (a line with a small circle at one end extending from the object's bounding box). The use of these handles is explained in more detail below. An example of visible handles can be seen in the page example illustrated in FIG. 20.

Grid

The user can choose to display a grid on the drawing area by pressing the <Show Grid> button, in which case the drawing page is reprinted showing faint grid lines and with the <Show Grid> button replaced by a <Hide Grid> button.

The user can specify the size of the grid by pressing the desired grid-size button on the drawing palette, or by entering the desired grid size in the grid size field (as shown in FIG. 22). If the user checks the <Snap To Grid> checkbox, all objects drawn thereafter are snapped to the grid. That is, any drawn object is repositioned and scaled so that the bounding box is aligned on the drawing's grid, whether the grid is visible or not. When the drawing page is reprinted the object is re-positioned and the <Snap To Grid> checkbox is replaced by the <Don't Snap To Grid> checkbox.

Manipulating Objects

The user can delete one or more objects by drawing a lasso starting at the <Delete> icon, and circumscribing or otherwise indicating the objects to be deleted. These objects are removed from the drawing when the page is reprinted.

The user can cut or copy one or more objects to their clipboard by drawing a lasso starting at the <Cut> or <Copy> icon, and circumscribing the objects to be cut or copied. Further, objects in the user's clipboard, whether from the drawing application or another netpage application, can be pasted onto the drawing. The user draws a lasso from the <Paste> icon to the desired paste point on the drawing field, and the pasted objects are shown next time the page is printed. Objects in the user's clipboard may also be pasted into other drawing-related applications.

Alternatively, the user is able to select content using the standard netpage selection mechanism, enabling the user to copy content, paste content, or delete the selected content. These techniques are described in further detail in our earlier application U.S. Ser. No. 09/663,640.

The user can move an object by drawing a stroke from inside the object, or from a point on the object's bounding box, to the desired location. The object is moved the length of the stroke, in the direction of the stroke. Further, the user can scale an object by drawing a stroke from any of the object's scaling handles 539. The object is scaled so that the corresponding scaling handle on the scaled object is coincident with the end of the user's stroke. If the stroke extends outside the object's bounding box the object is scaled up (i.e. enlarged), and, conversely, if the stroke extends inside the object's bounding box the object is scaled down (i.e. shrunk). The user can rotate an object on the drawing in one of two ways. The user can select an object to rotate by drawing a lasso from the <Rotate> icon and circumscribing the object (s), the user first entering the desired rotation, in degrees, in the <Deg> field. The rotation direction can be specified by signing the rotation angle, i.e. "+" indicates clockwise rotation and "−" indicates counterclockwise rotation. Alternatively, the user can rotate an object using the object's rotation handle 540, whereby the user draws a stroke from the end of the rotation handle 540 to a point above (for anti-clockwise rotation) or below (for clockwise rotation) the rotation handle 540, to indicate the desired rotation.

Where objects overlap on a drawing the user can specify the relative depth of the respective objects. To bring an object to the front of all other overlapping objects the user draws a lasso from the <To Front> icon circumscribing the object to move. Similarly, the user can send an object to the back of a group of overlapping objects using the <To Back> icon. The user can bring an object forward one layer using the <Move Fwd> icon, and back one layer using the <Move Back> icon.

The user can zoom in on an area of the drawing by drawing a lasso from the <Zoom In> icon and circumscribing the area to be zoomed, resulting in the selected area being expanded to the largest possible size while still showing the entire selection within the drawing field. Similarly, the user can zoom out by drawing a lasso from the <Zoom Out> icon and circumscribing an area into which the current visible drawing field is shown, the current visible drawing being then scaled down to the largest possible size still fitting within the selected area. The current zoom level is shown in the <Zoom %> field.

Objects within a drawing may be grouped together to form a single object, by means of the user drawing a lasso from the <Group> icon and circumscribing the objects to be grouped. The group may then be treated as a single object, and if handles are shown, the group of objects will have a single bounding box and a single rotation handle. Similarly, grouped objects can be ungrouped by drawing a lasso from the <Ungroup> icon and circumscribing the target group.

The user can apply a CPG operator to two objects by drawing a lasso from the CPG operator icon to the first object, and then a second lasso to the second object. The order of selection of the two objects is important for the difference operator, <−>. The order of selection for union, <+>, and intersection, <>, is not important, i.e. either order produces the same results.

The user can convert all freehand drawn objects into standard objects by clicking the <Auto Tidy> button. The application converts each freehand object into the closest matching standard object, and reprints the drawing page.

The user can choose to reprint the drawing page, ignoring all new drawing since the page was last printed, by pressing the <Reset Form> button. Further, the user can print a blank drawing form by pressing <New Form>, can print a palette page (shown in FIG. 21) by pressing the <Print Palette> button, can print the drawing field on a full page 538, without palettes, buttons or other netpage elements on the page, by pressing the <Print Full> button, and can print an updated drawing page by pressing the <Update> button.

Text

The user can include text on the drawing by hand-writing the text at the desired location on the drawing. The user then applies the <To Text> operation to the hand-writing, resulting in the conversion of the hand-writing to text. The text is tagged with the font setting from the user's current settings, and the text is shown in this font when the page is next printed.

Standard Objects

A user can readily include standard objects in a drawing, these standard objects being chosen from a standard object palette 544 including icons for drawing a line, an (elliptic) arc, a rectangle, a rounded corner rectangle, an ellipse, an open polygon (polyline), a closed polygon, and a curve. To include an object from the object palette 544 in the drawing, the user draws a line from the object icon to a point within the drawing field. The specified drawing field is the object's centre for an ellipse or arc. For all other standard objects, this point specifies the location of the bottom left corner of the object's bounding box.

More typically, a user draws the desired object freehand, and then converts it to a standard object by drawing a lasso, starting at the object palette icon and circumscribing the freehand object. The freehand object is converted by the application to a standard object with attributes matching the freehand object as closely as possible.

To draw a straight line the user draws a line in the drawing field, and then draws a lasso starting from the line icon and circumscribing the hand-drawn line. The line is then converted from a freehand object to a two-point polyline object with start and end points matching those drawn by the user.

To draw an arc the user draws an arc in the drawing field, and then draws a lasso starting from the arc icon and circumscribing the hand-drawn arc. The arc is then converted from a freehand object to an arc object with start and end points matching those drawn by the user.

To draw a rectangle (or rounded-corner rectangle) the user draws a rectangle in the drawing field, and then draws a lasso starting from the rectangle (or rounded-corner rectangle) icon and circumscribing the hand-drawn rectangle. The rectangle is then converted from a freehand object to a rectangle object with height and width matching those drawn by the user. Within the application a rectangle is represented by a closed polygon shape element and a rounded corner rectangle is represented by a closed curve shape element.

To draw an ellipse the user draws an ellipse in the drawing field, and then draws a lasso starting from the ellipse icon and circumscribing the hand-drawn ellipse. The ellipse is then converted from a freehand object to an ellipse object with height and width matching those drawn by the user.

To draw a polyline the user draws a polyline in the drawing field, and then draws a lasso starting from the polyline icon and circumscribing the hand-drawn polyline. The polyline is then converted from a freehand object to a polyline object. Within the application a polyline is represented as an open polygon i.e. a polygon shape element with a number of points and with the start point being different from the end point.

To draw a polygon the user draws a polygon in the drawing field, and then draws a lasso starting from the polygon icon and circumscribing the hand-drawn polygon. The polygon is then converted from a freehand object to a polygon object.

To draw a curve the user draws curve in the drawing field, and then draws a lasso starting from the curve icon and circumscribing the hand-drawn curve. The curve is then converted from a freehand object to a curve object, comprising a number of Bézier segments (see "3D Computer Graphics", Alan Watt, referred to above. The user can also create a curve by smoothing a polygon using the <Smooth> command.

Stock Objects

A user can include stock objects in their drawing, and these stock objects can be selected, using a suitable available netpage selection mechanism, and pasted onto the drawing field. Stock objects may be obtained from a stock object palette provided by the drawing application, or may be obtained from another application. Stock objects include images and clip-art.

Painting Versus Drawing

The painting application is a variation on the drawing application in which, in addition to a nib style, the user can also select a brush style, giving a richer selection of stroke styles.

Nib rotation and nib angle are important attributes in both drawing and painting. Nib pressure is also important for a painting application, to allow the brush stroke appearance to vary based on the pen pressure applied by the user. The painting application can simulate the visual effects of interactions between overlapping brush strokes, and between a brush stroke and the canvas, and this can include taking into account simulated physical characteristics of both the paint and the canvas media.

Changing the Nib Style

As explained above, a netpage pen 801 is a pen or stylus registered with the netpage system, each netpage pen 801 having a unique id 61. Each pen has a current nib 824, being the nib last notified by the pen to the system, and a current nib style 825, being the nib style last associated with the pen by an application, e.g. in response to the user selecting a color from a palette. The default nib style is the nib style associated with the current nib 824, and strokes 875 captured through a pen are tagged with the current nib style. When the strokes are subsequently reproduced, they are reproduced in the nib style with which they are tagged.

A netpage pen 801 may have interchangeable nibs to give the user the ability to change the marking nib. This pen with interchangeable nibs is described in further detail in our co-filed application U.S. Ser. No. 09/693,341. When the user attaches a new nib to the netpage pen, the pen obtains the nib id from the nib and notifies the system of the changed nib id. The system uses the nib id to look up the nib style, and the pen's nib style attributes are set to match the characteristics of the new nib. Subsequent user selections from the pen style palette will overwrite these nib style settings.

A netpage universal pen, described in further detail in further detail in our co-filed application U.S. Ser. No. 09/693,216, contains a printhead. The user selects pen/brush style attributes from a palette, thus updating the current nib style. The pen then faithfully reproduces a stroke which reflects current nib style attributes. Subsequent user selections from the pen style palette will overwrite the nib style settings and change the stroke style produced by the pen.

Nib Style Setting Request

A user can set nib style attributes (shape, size, color and opacity textures) from the drawing and painting application. These attributes are recorded against the current netpage pen being used. When a user activates a hyperlink to set the nib style, the page server 10 uses the pen id 61 to obtain the corresponding user id 60 from the registration server 11. It then builds a hyperlink request which records the ids of the requesting pen, user and printer, and identifies the clicked hyperlink instance.

When the application receives the hyperlink request from the page server, it may then choose to return a nib style request to the page server. The nib style request 542 includes the hyperlink request id 52 for the original hyperlink click, the application id 64, and the application's nib style request 542. The nib style request 542 specifies the nib style attributes to be recorded against the current netpage pen 801.

Figure 18:
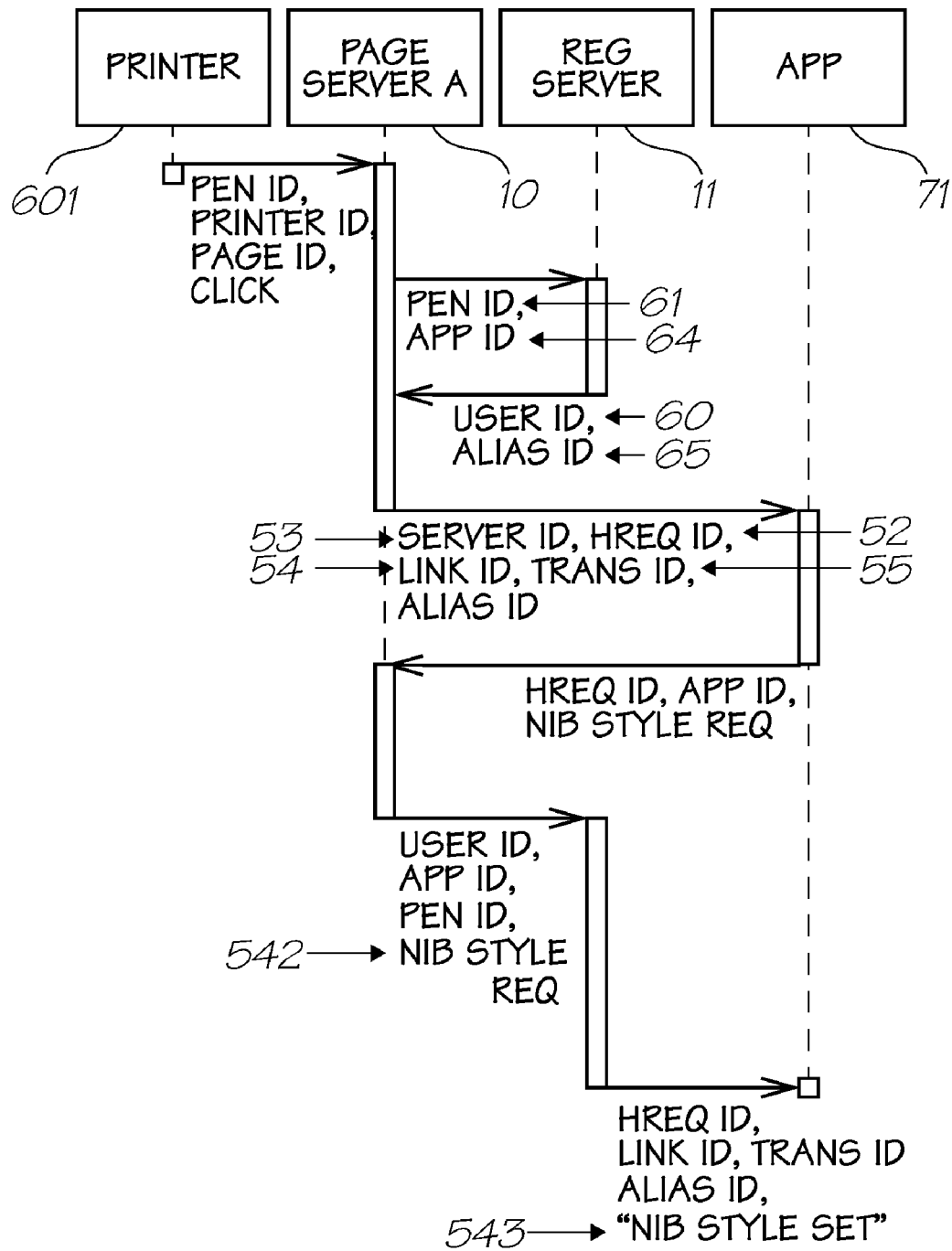
FIG. 18 illustrates a nib style setting protocol.

The page server 10 uses the hyperlink request id 52 to look up the user id 60 and pen id 61 of the original hyperlink request. The page server sends a nib style request 542 to the registration server 11, containing the user id, application id, pen id, and nib style request. The registration server records the requested nib style attributes for the relevant netpage pen. The registration server then sends a message 543 to the application 71 to confirm that the nib style request has been completed. The nib style setting protocol is shown in FIG. 18.

Conclusion

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. An input arrangement for controlling an electronic device, comprising:
   a substrate having a position-coding pattern printed thereon, said position-coding pattern coding first and second sets of absolute positions on spatially separate areas of said substrate, said first and second sets of absolute positions being mutually exclusive and coded by first and second subsets of said position-coding pattern;
   a handheld image-recording device comprising an image sensor for recording images of said position-coding pattern; and
   processing means configured for deriving at least one absolute position from the position-coding pattern in the recorded image, and for providing an instruction to the electronic device to perform a first function when said at least one absolute position belongs to the first set and a second function when said at least one absolute position belongs to the second set.

2. The input arrangement of claim 1, wherein at least part of said processing means is housed in said handheld image-recording device.

3. The input arrangement of claim 1, wherein said first function is visually indicated on said substrate.

4. The input arrangement of claim 3, wherein said first function is visually indicated by a button on said substrate.

5. The input arrangement of claim 1, wherein said first function generates a command function for controlling the electronic device.

6. The input arrangement of claim 1, wherein said first function changes a characteristic of said electronic device.

7. The input arrangement of claim 1, wherein said characteristic is identifiable by a user.

8. The input arrangement of claim 1, wherein said second function is an input function.

9. The input unit arrangement of claim 8, wherein said input function is a recording handwriting function.

10. The input arrangement of claim 9, wherein said processing means records a handwriting stroke as a sequence of absolute positions derived from said images.

* * * * *